United States Patent
Koppitz et al.

(10) Patent No.: US 8,595,914 B2
(45) Date of Patent: Dec. 3, 2013

(54) METHOD FOR UNRELEASABLE FASTENING

(75) Inventors: Bernd Koppitz, Winterbach (DE);
Rudolf Reinhardt, Esslingen (DE);
Heinz Schultz, Hochdorf (DE);
Bernhard Ziegler, Rechberghausen (DE)

(73) Assignee: Daimler AG, Stuttgart (DE)

( * ) Notice: Subject to any disclaimer, the term of this patent is extended or adjusted under 35 U.S.C. 154(b) by 934 days.

(21) Appl. No.: 11/816,039

(22) PCT Filed: Feb. 1, 2006

(86) PCT No.: PCT/EP2006/000848
§ 371 (c)(1),
(2), (4) Date: Apr. 14, 2008

(87) PCT Pub. No.: WO2006/084609
PCT Pub. Date: Aug. 17, 2006

(65) Prior Publication Data
US 2008/0229570 A1 Sep. 25, 2008

(30) Foreign Application Priority Data
Feb. 11, 2005 (DE) .......................... 10 2005 006 253

(51) Int. Cl.
*B23P 11/00* (2006.01)

(52) U.S. Cl.
USPC ........................................... 29/525.13

(58) Field of Classification Search
USPC ............. 29/447, 525.01, 525.06, 525.14; 228/101; 219/603, 612, 617
See application file for complete search history.

(56) References Cited

U.S. PATENT DOCUMENTS

| 2,110,832 | A | | 3/1938 | Hogg et al. |
| 3,114,827 | A | | 12/1963 | Kelemen et al. |
| 3,442,417 | A | * | 5/1969 | Pollanz .................. 220/62.11 |

(Continued)

FOREIGN PATENT DOCUMENTS

| DE | 1 099 663 | B | 2/1961 |
| DE | 27 39 867 | C3 | 6/1980 |

(Continued)

OTHER PUBLICATIONS

Anonymous: "Single sided forged sheet welding of sheet material," Research Disclosure, vol. 308, No. 33, Dec. 1989, Mason Publications, Hampshire, GB.

(Continued)

*Primary Examiner* — David Bryant
*Assistant Examiner* — Moshe Wilensky
(74) *Attorney, Agent, or Firm* — Patent Central LLC; Stephan A. Pendorf

(57) ABSTRACT

The invention relates to a method for the unreleasable fastening of at least one component to a basic component with the aid of a bolt projecting through a bore in the component or components, first the bolt being welded electrically with one end face on the surface of the basic component and subsequently being deformed plastically. So that components consisting of any desired materials can be used, it is proposed, according to the invention, that the shank of the bolt, which has a head, be upset, until the underside of the head lies in regions on the surface of the component. Furthermore, an unreleasable connection of one or more components to a basic component is proposed.

13 Claims, 3 Drawing Sheets

(56) References Cited

U.S. PATENT DOCUMENTS

| | | | |
|---|---|---|---|
| 4,119,827 A | 10/1978 | Lenox | |
| 4,261,245 A | 4/1981 | Mauer | |
| 4,689,465 A * | 8/1987 | Pal | 219/117.1 |
| 6,079,530 A | 6/2000 | Arhab | |
| 7,030,333 B2 * | 4/2006 | Bradley | 219/99 |
| 2002/0027053 A1 | 3/2002 | Back et al. | |
| 2005/0161442 A1 | 7/2005 | Bradley | |

FOREIGN PATENT DOCUMENTS

| | | | |
|---|---|---|---|
| DE | 31 40 368 A1 | 1/1983 | |
| DE | 33 16 047 A1 | 11/1983 | |
| DE | 42 37 361 C2 | 5/1994 | |
| DE | 297 18 724 U1 | 9/1998 | |
| GB | 1 528 730 A | 10/1978 | |
| GB | 1528730 A | * 10/1978 | |
| JP | 50133947 A | 11/1975 | |
| JP | 10503001 A | 3/1998 | |
| JP | 200052050 A | 2/2000 | |
| JP | 2003145279 A | 5/2003 | |

OTHER PUBLICATIONS

DVS-Merkblätter Widerstandsschweiβtechnik, Band 68, Teil III, Düsseldorf, DVS GmbH, 1981, pp. 52-58.

* cited by examiner

METHOD FOR UNRELEASABLE FASTENING

BACKGROUND OF THE INVENTION

The invention relates to a method for the unreleasable fastening of at least one component to a basic component, to an unreleasable connection of at least one component to a basic component, and to the use of the method for fastening a guide of a piston of a lockup clutch of a torque converter to the cover of the torque converter.

In manufacturing technology, there is, in many places, the need to fasten one or more components of the end face to a basic component which for structural reasons should not have any continuous bore, so that conventional methods, such as screwing or riveting, do not apply.

DE 33 16 047 A1 discloses a method in which a component, a pole mass, is fastened with the aid of a bolt to a housing which has a bore. In this case, the bolt is introduced through a bore into the housing and is fastened on the end face to the pole mass by electrical welding. In the next operation, the bolt is deformed plastically by forming, in order to produce a head.

This method has the disadvantage, however, that the bore in the housing and the bolt have virtually the same diameter. Consequently, during electrical welding, a shunt occurs in the case of a housing consisting of an electrically conductive material, since the electrical current is conducted not only through the bolt, but also through the housing itself in the vicinity of the bore. This method therefore functions only in those instances where the housing part consists of an electrically nonconductive material.

BRIEF SUMMARY OF THE INVENTION

The object on which the invention is based is to propose a method and an unreleasable connection, made by means of the method, of components to a basic component with the aid of a bolt by end-face welding and simultaneous plastic deformation of the bolt, with the aid of which even parts consisting of any desired materials can be connected to one another.

The object is achieved, according to the invention, by means of the features set forth in the claims.

Accordingly, the shank of the bolt, which has a head, is compressed, until the underside of the head lies in regions on the surface of the component. One advantage of this method is that welding and plastic deformation can be carried out in one operation and therefore time and costs can be saved. Furthermore, since the bolt has a head, a possibility is provided for the reception of any spatters.

Advantageously, the shank of the bolt is heated, and at the same time compressed, by means of a second electrical pulse applied after a short time interval after the end face has been welded on. Thus, both the occurrence of spatters and the introduction of a large amount of heat into the vicinity of the connection point can be avoided.

Advantageously, a projection welding method is used for welding on. If the bolt has a tip, this welding method proves to be particularly advantageous.

In an advantageous refinement of the method, the shank of the bolt is compressed during the method, such that it completely fills the bore in regions in the circumferential direction. Thus, in addition to the actual connection of the components, leaktightness can also be achieved. Furthermore, since, during cooling, the bolt contracts radially and axially and a mutual bracing of the connected components is achieved, a high strength of the connection is ensured.

In an advantageous refinement, the bolt is introduced into the bore together with a welding electrode by means of which it is connected firmly, but releasably. This dispenses with an additional process step with the insertion of the bolt into the bore, thus making the method simpler and more cost-effective. Furthermore, it is thus possible for the bolt, which, of course, has play with respect to the bore, to be centered at the same time as the introduction and then to be fixed directly in this position.

Advantageously, the method is carried out on a welding press. A commercially available and versatile machine for carrying out the method in series manufacture can thereby be employed.

Furthermore, an unreleasable connection of one or more components to a basic component is proposed. In this case, the bolt has a head on the side facing away from the basic component and the bore has a larger diameter than the shank of the bolt located in it before plastic deformation. A straightforward resistance welding method can thereby be employed, in which the highest electrical resistance occurs between the end face of the bolt and the basic component, that is to say exactly at the welding point.

Furthermore, advantageously, the component located next to the basic component has, in the surface facing the basic component, a recess in the vicinity of the bore. This recess, on the one hand, serves for receiving part of the bead occurring during welding, and, on the other hand, this cavern also receives the spatters possibly occurring during welding.

Advantageously, the bore has a conical geometry with a diameter increasing away from the basic component. Such a conical bore can receive optimally the material displaced during the compressing of the shank of the bolt.

In a further advantageous refinement, the head of the bolt has an integrally formed peripheral sealing ring on the surface facing the component. Alternatively, the component located next to the basic component has on the surface an integrally formed peripheral sealing ring. The leaktightness of the connection can thus be achieved by means of a simple measure.

Furthermore, the use of the method as claimed in one of claims 1 to 6 for the unreleasable connection of a guide of a piston for the lockup clutch of a torque converter of a motor vehicle to a cover of the torque converter is proposed.

Further refinements and advantages of the invention may be gathered from the description.

BRIEF DESCRIPTION OF THE SEVERAL VIEWS OF THE DRAWINGS

The invention is explained in more detail, with reference to more than one exemplary embodiment, in the drawings in which.

DETAILED DESCRIPTION OF THE INVENTION

Figure 1:
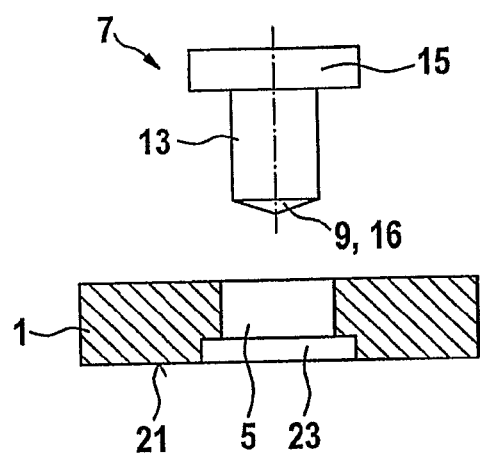
FIG. 1 shows a component and a bolt before the method is carried out.

FIG. 1 shows a component 1 which is to be fastened to a basic component 3, not yet illustrated here. The component 1 has a continuous bore 5. Furthermore, a bolt 7 is illustrated, which has a shank 13 and a head 15. In this case, the bore 5 has a larger diameter than the shank 13, so that, in the assembled position, the bolt 7 has play with respect to the bore 5. In this exemplary embodiment, that end face 9 of the bolt 7 which faces away from the head 15 is configured in the form of a tip 16. The bolt 7 consists, for example, of a steel having a low carbon content, in order to ensure high toughness. Furthermore, the component 1 has on one surface 21 a recess 23, the function of which is described further below. The recess 23 is cylindrical in this exemplary embodiment, but it may also have another geometry.

Figure 2:
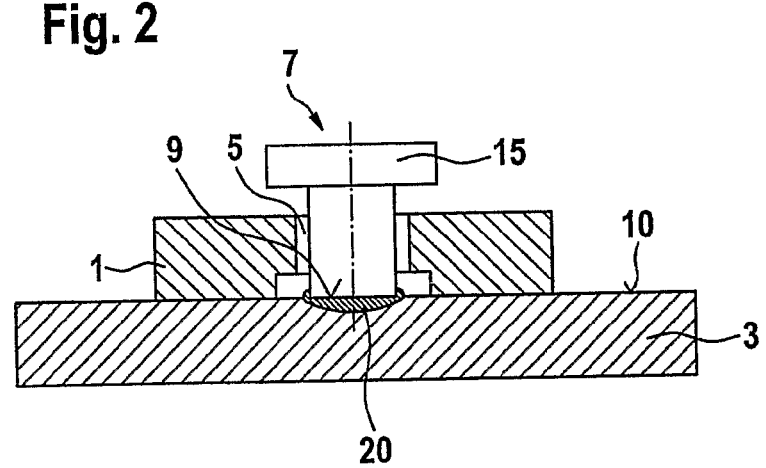
FIG. 2 shows a component, a basic component and a bolt after the first method step.

FIG. 2 shows, in addition to the component 1, the basic component 3 to which the component 1 is to be fastened unreleasably with the aid of the bolt 7. For this purpose, first, the bolt 7 is introduced into the bore 5 with the aid of a welding electrode, not illustrated here, to which the head 15 of the bolt 7 is connected firmly, but releasably. This connection of the head 15 to the welding electrode is made, for example, by means of a vacuum. Alternatively, the head 15 may be connected to the welding electrode by means of mechanical clamping.

The bolt 7 is then welded with its end face 9 onto the surface 10 of the basic component 3. This takes place here, for example, by means of a resistance welding method. However, all electrical welding methods are suitable. The resistance welding methods include here, in particular, the use of a projection welding method. For this purpose, the end face 9 of the bolt 7 is shaped correspondingly as a tip 16. Welding on takes place by means of an electrical welding pulse. In this exemplary embodiment, the pulse possesses as order of magnitude a length of 30-60 milliseconds, this being a value which is customary in the end-face resistance welding of bolts 7. FIG. 2 shows, furthermore, the welding zone 20 which is then obtained. An alternative to electric resistance welding is, for example, arc stud welding. It is not suitable here, however, since, in this method, the arc would jump over onto the other side, which is undesirable.

Figure 3:
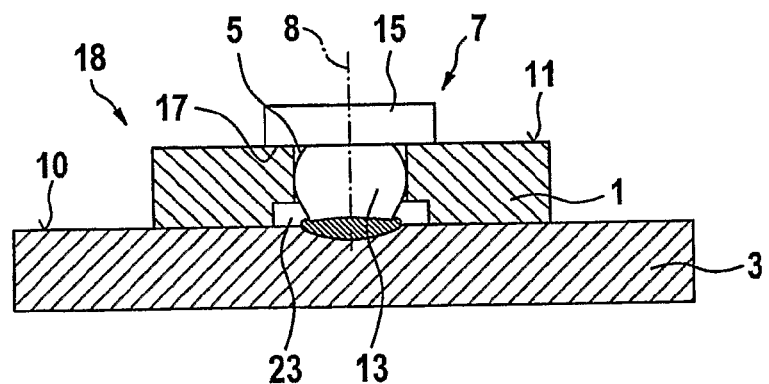
FIG. 3 shows the unreleasable connection after the method has been carried out.

FIG. 3 illustrates the unreleasable connection 18 of the component 1 and basic component 3 after the next and last method step has been carried out. In this step, the bolt 7 is deformed plastically. This plastic deformation is brought about in that a second electrical pulse is applied which follows the first welding pulse at a short time interval. This second pulse with a low current intensity is markedly longer than the first welding pulse. It may amount, for example, to 1000 milliseconds. The bolt 7 is heated and softened by means of the second pulse.

Simultaneously, a force is applied in the longitudinal direction 8 of the bolt 7 and leads to plastic deformation in the form of an compressing of the shank 13 of the bolt 7. The compressing force may in this case have the same magnitude as the welding force or be lower or higher than this. This compressing movement is carried out until the head 15 of the bolt 7 lies at least in regions with its underside 17 on the surface 11 of the component 1. The material of the shank 13 which is forced to the sides during compressing then completely fills the bore 5 in regions in the circumferential direction. The spatters occurring when the end face 9 of the bolt 7 is welded onto the surface 10 of the basic component 3 and also material displaced in this region during compressing are received in the recess 23, so that there is a clean smooth contact surface between the basic component 3 and the component 1.

Since, in this method, a welded connection is made only between the bolt 7 and the basic component 3, it is possible to tie up to the basic component 3 components 1 which are not weldable, that is to say, for example, components consisting of aluminum, ceramic or plastic and composites of such components. Only the bolt 7 and the basic component 3 must consist of a weldable material.

Since the bolt 7 has play with respect to the bore 5 before the method is carried out, furthermore, the end face 9 of the bolt 7 can be welded on the basic component 3 without a short circuit even in the case of the connection of electrically conductive materials for the component 1, since the welding current is conducted only through the bolt 7 itself. In any event, the high electrical resistance required for welding occurs between the end face 9 of the bolt 7 and the surface 10 of the basic component 3.

After the method has been carried out, the bolt 7 shrinks on account of the preceding thermal forming. An additional bracing of the connection 18 thereby occurs which results in high strength.

Furthermore, welding and subsequent plastic deformation take place in one operation on a standard welding press, without additional conversion or rechucking measures being necessary.

The hardening of the welding zone 20 possibly caused by welding is reduced by virtue of subsequent heating within the framework of plastic deformation.

Figure 4:
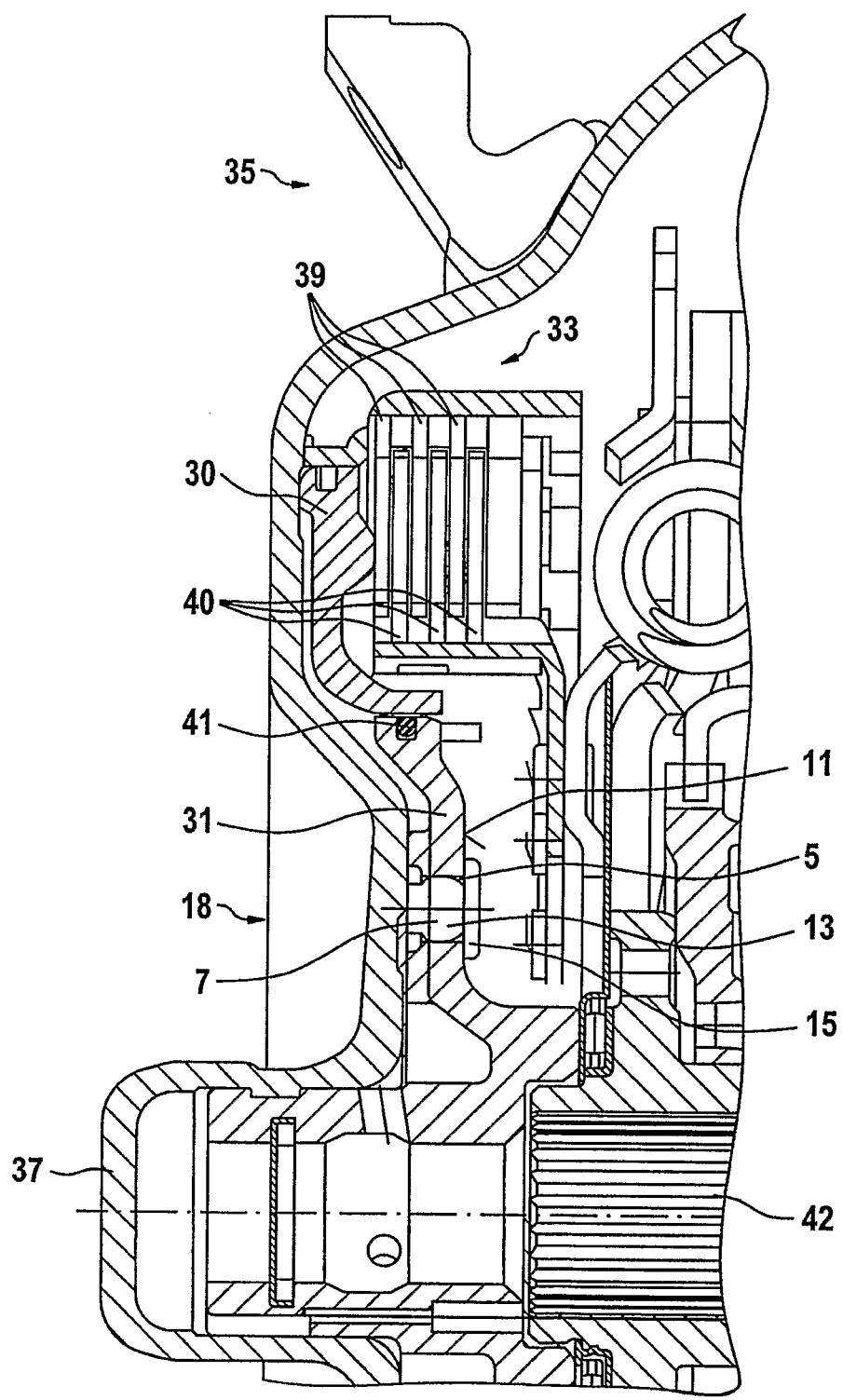
FIG. 4 shows a connection of a piston guide to a housing of a torque converter.

FIG. 4 shows one possible application of the connection method illustrated in detail above. A section through a torque converter 35 for a motor vehicle is illustrated here in the form of a detail. This torque converter 35 has the task of transmitting or appropriately adapting a torque from the engine to the transmission. In order to avoid the hydraulic slip between the engine and transmission in the driving mode and consequently to lower the gasoline consumption of the engine, the torque converter 35 has a lockup clutch 33. This consists of two lamella stacks 39 and 40 which, to achieve identical rotational speeds of the engine and transmission, are compressed by means of a piston 30 around which oil flows and which is moved. In the event, by means of the pressed-together lamella stacks 39 and 40, direct mechanical coupling is achieved between the cover 37 of the torque converter, which cover is driven by the engine and is connected to the outer lamella stack 39, and the transmission input shaft 42, which is connected to the inner lamella stack 40. An efficiency of the torque converter 35 of a hundred percent is thereby achieved.

The piston 30 is connected to a piston guide 31 by means of an O-ring 41. This piston guide 31 must be connected unreleasably to the cover 37 at a plurality of locations. This unreleasable connection has to satisfy high requirements in this case: on the one hand, the connection must be leaktight, since oil flows on all sides both around the piston 30 and around the piston guide 31. On the other hand, no contamination of the oil flowing around the connection point should occur due to the connection method. After the piston guide 31 has been connected to the cover 37, the region is no longer accessible from outside and can therefore no longer be cleaned at a later stage. Furthermore, no or only insignificant heat should be introduced into the vicinity of the connection point as a result of the connection, since the heat-sensitive O-ring 41 is arranged directly adjacently. Furthermore, the piston guide 31 is, for example, an aluminum diecasting and is not suitable for a conventional welding method.

FIG. 4, then, illustrates a connection 18 according to the invention of the piston guide 31 to the cover 37 by means of a bolt 7 after the method described above has been carried out. In terms of the above description, the piston guide 31 corresponds to the component 1 and the cover 37 to the basic component 3. The bolt 7 is already compressed to an extent such that its shank 13 completely fills the bore 5 in the piston guide 31 in the middle and its head 15 lies on the surface 11 of the piston guide 31. This connection 18 fulfills all the requirements listed above. Furthermore, the connection of the piston guide 31 and cover 37 can be carried out simultaneously at a plurality of locations in one operation.

The complete mounting of a torque converter 35 proceeds in the following steps: first, a plurality of bolts 7 are sucked or clamped onto welding electrodes, and then the cover 37 is positioned unequivocally, for example, by means of its mandrel. As a result of simultaneous or time-delayed ignition, the piston guide 31 is thereafter connected to the cover 37 at a plurality of locations. Subsequently, the further mounting steps, such as the fitting of the lamella stacks 39, 40, are carried out.

Figure 5:
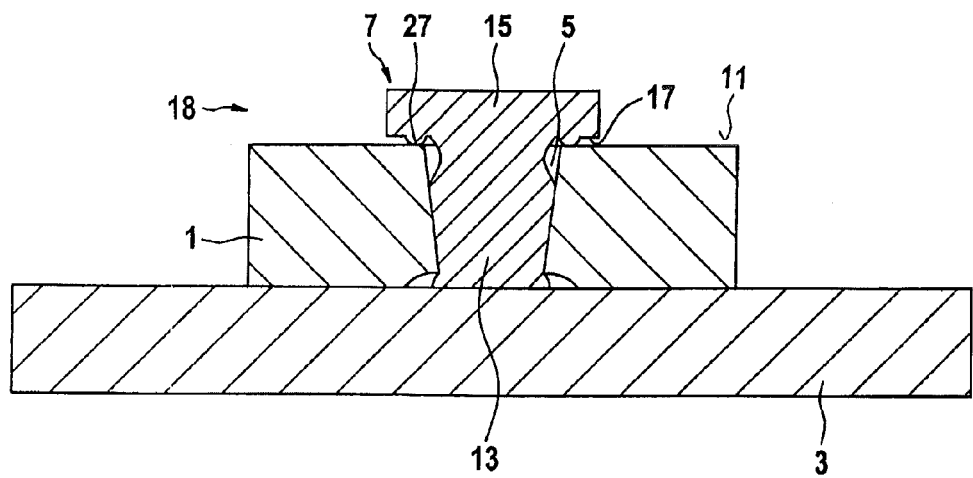
FIG. 5 shows a connection with an alternative configuration of the bore.

In addition to the cylindrical geometry, illustrated above, of the bore 5, it is possible to provide a conical geometry, such as is illustrated in FIG. 5. A conical bore 5 is simpler to produce than a cylindrical bore, for example when a casting is used as the component 1. Moreover, owing to such a geometry, a selfcentering of the bolt 7 in the piston guide 31 is achieved. The diameter of the bore 5 increases with a growing distance from the basic component 3. The opening angle may in this case vary, in this example it amounts to approximately 25°.

FIG. 5 illustrates the connection 18 after the method has been carried out. It can be seen that the material displaced during the compressing of the shank 13 is pressed against the wall of the bore 5 and therefore fills the bore 5 virtually completely. Furthermore, in this exemplary embodiment, a peripheral sealing ring 27 is integrally formed onto the underside 17 of the head 15 of the bolt 7. After the compressing operation, this sealing ring 27 lies on the surface 11 of the component 1 and additionally seals off the connection 18. Alternatively, a similar peripheral sealing ring may be provided on the surface 11 of the component 1 and then fulfills the same function. Such a sealing ring may be provided directly on the component 1, for example, during casting.

In addition to the connection 18 of a component 1 to a basic component 3, as illustrated in the previous exemplary embodiments, even a plurality of components may be fastened jointly to a basic component 3. In this case, the components 1 must all have bores 5 which are in alignment with one another and through which the bolt 7 is introduced. After the method has been carried out, the head 15 of the bolt 7 then lies in regions on the surface 11 of that component 1 which is arranged furthest away from the basic component 3. A composite of a plurality of components consisting of different materials can also thereby be tied up to a common basic component 3.

The invention is not restricted to the exemplary embodiments illustrated.

For example, it is not absolutely necessary to fasten the bolts 7 to the welding electrode by a vacuum. Furthermore, it may also be fastened there, for example, magnetically or mechanically.

The invention claimed is:

1. A method for the leakproof unreleasable fastening of at least one component (1) to a basic component (3) with the aid of a bolt (7) projecting through a bore (5) in the component(s) (1), the bolt (7) having an end face (9) opposite a head (15), the bolt having a shank narrower in diameter than the diameter of the bore (5), the method comprising:
   inserting the end face (9) of the bolt (7) through the bore (5) to contact the surface (10) of the basic component (3), leaving a gap between the shank and the bore (3),
   electrically welding the bolt (7) at the one end face (9) to the surface (10) of the basic component (3) with formation of a weld bead, and
   after the end face has been welded on, deforming the bolt plastically, wherein the shank (13) of the bolt (7) is compressed until the shank completely fills the bore in regions in the circumferential direction and the underside (17) of the head (15) lies in regions on the surface (11) of the component (1), forming a leaktight fastening,
   wherein the component (1) located next to the basic component (3) has, in the surface (21) facing the basic component (3), a recess (23) in the vicinity of the bore (5) for receiving the weld bead and spatter produced during electrical welding.

2. The method as claimed in claim 1, wherein the shank (13) of the bolt (7) is heated, and at the same time compressed, by means of a second electrical pulse applied after a short time interval after the end face (9) has been welded on.

3. The method as claimed in claim 2, wherein a projection welding method is used for welding on.

4. The method as claimed in claim 1, wherein the shank (13) of the bolt (7) is compressed such that it completely fills the bore (5) in regions in the circumferential direction.

5. The method as claimed in claim 1, wherein the bolt (7) is introduced into the bore (5) together with a welding electrode to which it is connected firmly, but releasably.

6. The method as claimed in claim 1, wherein the method is carried out on a welding press.

7. The method as claimed in claim 1, wherein the bore (5) has a conical geometry with a diameter increasing away from the basic component (3).

8. The method as claimed in claim 1, wherein the head (15) of the bolt (7) has an integrally formed peripheral sealing ring (27) on the underside (17) facing the component (1).

9. The method as claimed in claim 1, wherein the component (1) located next to the basic component (3) has on the surface (11) an integrally formed peripheral sealing ring.

10. The method as claimed in claim 1, wherein the at least one component (1) is a guide (31) of a piston (30) for the lockup clutch (33) of a torque converter (35) of a motor vehicle, and wherein the basic component (3) is a cover (37) of the torque converter (35).

11. A method for the leakproof unreleasable fastening of at least one component (1) to a basic component (3) with the aid of a bolt (7) projecting through a bore (5) in the component or components (1), the bolt (7) having a head (15) at one end and an end face (9) at the other end and having a diameter smaller than the diameter of the bore (5), wherein the component (1) located next to the basic component (3) has, in the surface (21) facing the basic component (3), a recess (23) in the vicinity of the bore (5), the method comprising:
   inserting the end face (9) of the bolt (7) through the bore (5) to contact the surface (10) of the basic component (3), leaving a gap between the shank and the bore (3),
   welding the bolt (7) electrically at the one end face (9) to the surface (10) of the basic component (3) with formation of a weld bead, and
   applying force in the longitudinal direction of the bolt (7) to plastically deform the bolt (7), wherein a shank (13) of the bolt (7) is compressed until the shank completely fills the bore in regions in the circumferential direction and the underside (17) of the head (15) lies in region of the surface (11) of the component (1), forming a leaktight fastening,
   wherein the component (1) located next to the basic component (3) has, in the surface (21) facing the basic component (3), a recess (23) in the vicinity of the bore (5) for receiving the weld bead and spatter produced during electrical welding.

12. The method as claimed in claim 1, wherein the component (1) is a cast component.

13. The method as claimed in claim 1, wherein the component (1) is a cast component and the bore (5) has a conical geometry with a diameter increasing away from the basic component (3).

* * * * *